United States Patent

[11] 3,617,584

| [72] | Inventors | Herbert P. Flack<br>Ellicott City;<br>Herbert M. Katz, Silver Spring; George E. Ashby, Highland, all of Md. |
|---|---|---|
| [21] | Appl. No. | 656,266 |
| [22] | Filed | July 26, 1967 |
| [45] | Patented | Nov. 2, 1971 |
| [73] | Assignee | W. R. Grace & Co.<br>New York, N.Y. |

[54] PROCESS FOR FORMING UNIFORM MICROSPHERES
6 Claims, 2 Drawing Figs.

[52] U.S. Cl. .................................................. 264/.5, 252/301.1, 264/9
[51] Int. Cl. .......................................................... G21c 21/00
[50] Field of Search ............................................ 252/301.1; 264/.5, 9; 259/4

[56] References Cited
UNITED STATES PATENTS

| 3,060,510 | 10/1962 | Fischer et al. ................. | 264/9 |
| 3,204,934 | 9/1965 | Graham et al. ................ | 259/4 |
| 3,235,326 | 2/1966 | Slooten ........................ | 264/9 |
| 3,325,858 | 6/1967 | Ogden et al. .................. | 264/9 |
| 3,352,950 | 11/1967 | Helton et al. ................. | 264/.5 |

*Primary Examiner*—Carl D. Quarforth
*Assistant Examiner*—Melvin J. Scolnick
*Attorneys*—Joseph P. Nigon and Kenneth E. Prince ABSTRACT: A process for preparing uniform sized microspheres of actinide, lanthanide and zirconium oxides and carbides, using sols or solutions as the feed. Uniform microspheres within a narrow size range are prepared using a vibrating diaphragm in the feed line.

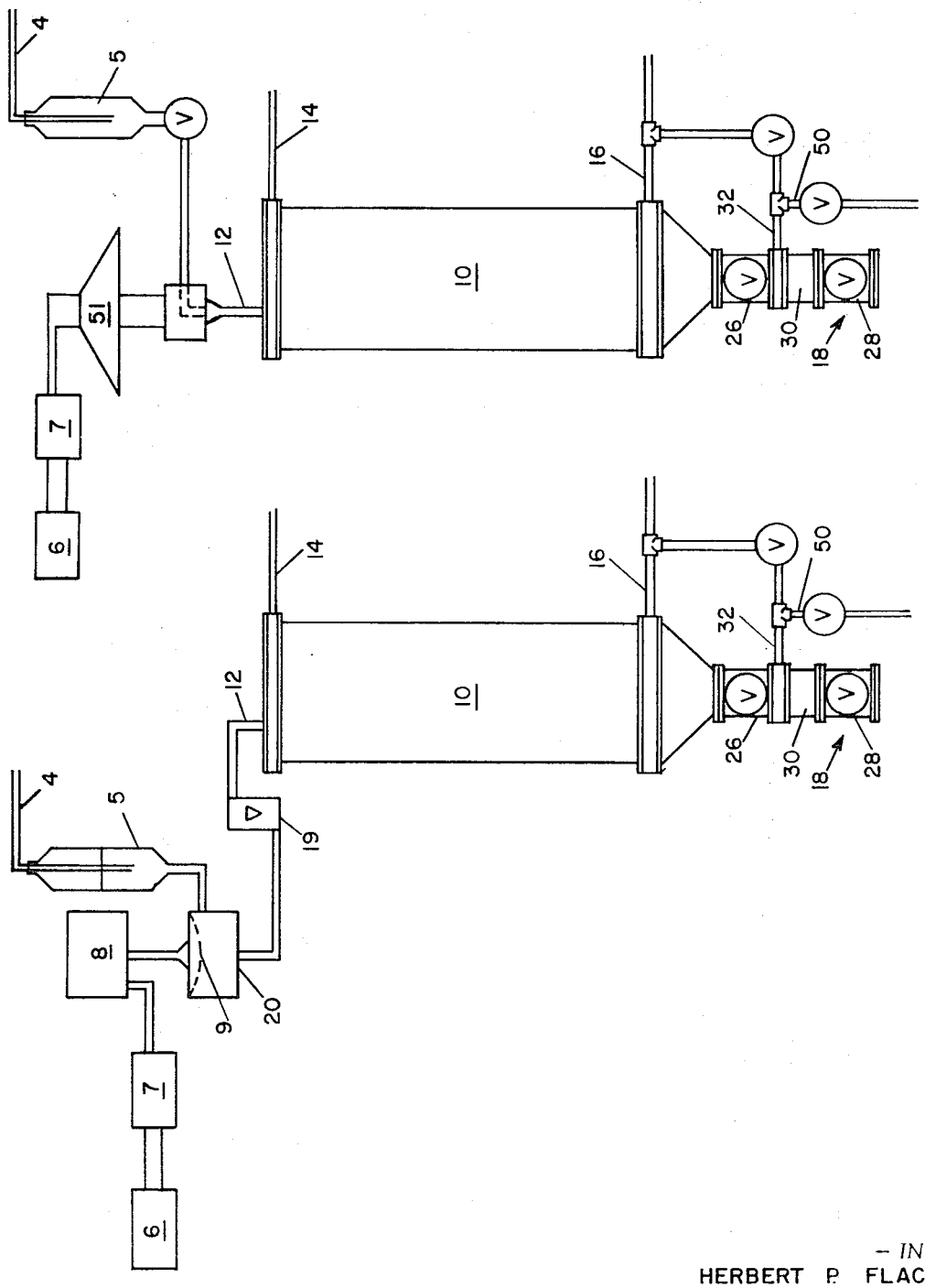

PROCESS FOR FORMING UNIFORM MICROSPHERES

This invention relates to a process for producing uniform spherical particles, conveniently designated microspheres, of materials such as urania, thoria, plutonia and other actinide oxides, lanthanide oxides, zirconia, yttria, beryllia and mixtures of these metal oxides with or without carbon. The process is carried out by introducing a continuous stream of the feed into a reservoir where it is subjected to vibrations before it is fed through a tube into a solvent-filled column. The vibrations may also be transmitted to the feed by placing the vibrating source directly upon the tubes (preferably plastic) which carry the feed to the column. The microspheres are recovered from the solvent in the column.

Microspheroidal particles of actinide oxides and carbides, ceramic oxides and carbides and mixtures thereof are of paramount importance in the field of nuclear fuels. The current reactor design, especially designs of the high-temperature gas-cooled reactors, have placed very demanding requirements on the fuel employed. The fuel must be resistant to oxidation and fission product release and must be near theoretical density to provide the requisite efficiency.

The fuel elements are usually formed by dispersing the microspheroidal fuel material in a ceramic matrix which is then pressed or compacted into the desired shape under high pressures. The fuel material must be sufficiently strong to withstand severe stresses during compaction. The microsphere products prepared by the process of this invention have uniform size and shape to effect a homogeneous concentration of fuel in the matrix.

The processes for preparing metal oxide sols to which this particular apparatus is applicable have already been disclosed. The sols may be dehydrated to form spherical particles in a dehydrating solvent. Another method applicable to the use of the apparatus of the present invention comprises dispersing uniformly sized droplets of a sol or solution feed into a solvent system. The solvents are preferably either water-immiscible solvents or water-saturated solvents containing dissolved ammonia. The apparatus can also be used in a two-layer solvent system, one layer of which is a water-immiscible, water-saturated solvent, and the lower layer of which is an aqueous ammonia solution. The microsphere product recovered has an improved uniformity and the size of the product can be controlled within narrow limits by the use of a vibrator in the feed system. In addition, our apparatus can be used in the system for preparing microspheres or larger sized spheroids directly from a solution. In this process a solution of a salt of the metal oxide is admixed with a water-soluble resin that increases in viscosity in an alkaline medium. The droplets of solution are fed into an aqueous alkaline solution to form microspheres or spheroids which are recovered and dried.

The metal compounds which are most desirable in nuclear reactor fuels include the oxide and carbides of uranium, thorium, and plutonium. The fuels may include other components, such as zirconium, yttrium, the lanthanides and beryllium. In the process of this invention, microspheres made up of these oxides or carbides are formed by the general procedure of introducing a feed under pressure into a reservoir having a vibrating diaphragm positioned in the upper portion thereof. The function of the vibrating diaphragm is to disperse the feed into highly uniform droplets. The droplets are then gelled or dehydrated and the microspheres recovered from the solvent.

The feed is either an aquasol or a solution of the materials which are desired in the microsphere product. Suspensions wherein the particles have a size of less than 1 micron can also be used as feed in the process. The method of preparing the feed solutions and/or suspensions has been previously disclosed and are not a critical part of this invention.

If the feed is an aqueous solution, the solution may contain from 0.01 grams per liter up to the saturation level of dissolved salts and metal cations selected from the group consisting of $U^{+4}$, $(UO_2)^{+2}$, $Th^{+4}$, $Pu^{+4}$, $(PuO_2)^{+2}$, $(ZrO)^{+2}$, $Be^{+2}$, $Y^{+3}$, lanthanides and mixtures thereof. Additionally, the solution can also contain up to 750 grams per liter of suspended metal oxide particles having a size range of less than 1 micron. Representative compounds include uranium dioxide, uranium trioxide, thorium dioxide, plutonium dioxide, plutonium trioxide, zirconium dioxide, beryllium oxide, yttrium oxide, lanthanide oxides, and mixtures thereof. The solutions can also contain from 0 to 5 moles of colloidal carbon per mole of metal in the feed.

The feed may, if desirable, contain an ammonia releasing agent, such as hexamethylene tetramine, acetamide, ammonium carbamate, ammonium cyanate, urea and mixtures thereof. Where ammonia-releasing agent is added, the agent is present in the feed from 70 to 300 percent of the stoichiometric concentration required to precipitate the metal in the feed as the hydrous oxide, if a solution is used; from 0–300 percent, if a sol is used; and intermediate quantities, if the feed is a mixture of sol and solution.

If the use of a dehydrating solvent is the chosen method of sphere formation, the preferred solvent is a liquid which is immiscible with water and which has a limited solubility for water of 1 to 30 weight percent. Feed droplets are partially dehydrated to form microspheres by transfer of the aqueous phase into a dehydrating solvent. Solvents must be inert, free of objectionable physical characteristics, such as emulsifying tendencies, for example. Solvents giving the best results include the alcohols. Representative examples include hexanol, ethylhexanol, butanol and ethylbutanol. Solvents having solubilities for water which are higher than desired can be mixed with sufficient water to reduce the solubilities to the desired level.

Our process and the apparatus also gives satisfactory results when the chosen solvent is a water-saturated solvent. Solvents giving the best results are the higher alcohols and hydrocarbons which are substantially water-immiscible. The solvent must be inert, free of objectionable physical properties, and must have a density low enough to permit settling of the microspheres. However, the solvent selected can have a low saturation concentration with water. Solvents with solubilities for water of from 1 to 30 percent have provided satisfactory results.

The solution and sol droplets are normally dehydrated in the column. The stream of solvent flows upwardly in the column; the droplets are dehydrated as they move downward through the solvent. The microspheres are dehydrated to a final water content of less than 55 volume percent.

In the system using a solvent which is water-saturated and contains dissolved ammonia, the droplets are dispersed into the solvent in the column as described above. Clearly, however, the droplets are not dehydrated, but are gelled by the action of ammonia as they move through the solvent.

If the two-layer solvent system is used in the column, there is generally no upward flow in the column. The droplets are dispersed in the top layer of the water-immiscible solvent that has been saturated with water, and the droplets fall through this layer in the column. They pass through the interface between the layers and into the aqueous ammonia layer where they are gelled.

The feed to the column is independent of the solvent chosen. The feed is preferably injected through a small diameter tube such as a hypodermic needle. This tube is connected directly to the feed reservoir with vibrating diaphragm positioned therein. By varying the frequency and amplitude of the vibrations, droplets having greater size uniformity can be formed.

The size of the droplets can also be regulated by control of the frequency of the vibrations. Thus, in the preferred embodiment, the incoming feed stream is subjected to the vibrations immediately prior to entrance into the solvent system.

Referring to the FIGS. 1 and 2, it will be seen that the general description has been chosen to refer to a single layer column system, either with a dehydrating or water-saturated, ammonia-containing solvent. The process and apparatus of this invention can also be used in a two-layer solvent system, if desired.

Referring now to FIG. 1, extraction column 10 has a feed introducing means 12 and a solvent inlet 16 and a particle outlet 18 at the lower end. The feed inlet means 12 is connected to a feed reservoir 20 having a diaphragm of gum rubber, Teflon, or other flexible material 9 positioned therein. Immediately above the diaphragm is a driver (vibrator) to which a plunger is attached and which is operated through the amplifier 7 by a generator 6. Alternately the plunger can be placed directly on the feed lines leading to the column thereby eliminating the reservoir. The sol or solution to be fed to the column is accumulated in a storage vessel 5 having a gas pressure supply means 4 whereby the feed is passed into the reservoir 20 under gas pressure and then to the feed-introducing means 12. A flow meter device, such as a rotometer, is shown at 19 and can be used, if desired. Any other suitable means of steadily transferring the feed from the storage tanks (such as a pump) can be used. The feed-introduction means 12 is preferably a small tube, such as a hypodermic needle having an internal diameter in the range of 0.008–0.047 inches.

The spherical particle outlet 18 can comprise a first valve 26 connected to and in communication with the bottom of the column 10, a second valve 28 having an inlet and outlet and intermediate chamber 30, communicating with the outlet of the first valve and inlet of the second valve. Fluid conduit 32 is connected to a solvent source and the chamber 30 for delivery of the solvent into the chamber, flushing the accumulated microspheres therein through a second valve 28. A vacuum source to evacuate the air trap between the two valves after removal of the product is provided and shown in the drawing at 50. Any other arrangement for removing microspheres from the column without significantly disturbing the conditions of the column could be used.

FIG. 2 shows an alternative embodiment wherein the feed stream is subjected to vibrations immediately prior to its entrance into the column. In this system, the reservoir is omitted and the orifice 12 connected directly to source of vibration (a speaker or driver) 51. Several needles can be conveniently attached to the same source of vibration as long as the weight of the needles does not interfere with the generation of the vibrations.

In the embodiments shown in FIGS. 1 and 2, the feed is introduced into the top of the column, and the dehydrated or gelled microspheres are removed from the bottom. Processes can also be used where the velocity of the solvent upward through the column can sufficiently carry the suspension droplets and microspheres upward in its flow. For example, the feed can be introduced in the middle or the bottom of column 10, the microspheres can be removed together with the solvent through the outlet 14. The microspheres can be separated from the solvent by sedimentation, filtration or centrifugation.

Our invention is further illustrated by the following specific but nonlimiting examples.

Example I

A uranium dioxide aquasol was produced by the electrodialysis of a uranyl chloride solution at 40° C. The sol contained 150 grams per liter of $UO_2$ and from there was transferred to a reservoir containing a vibrating diaphragm and was injected into a column 3 inches in diameter and 9 feet high through a 22 gauge hypodermic needle. The hexanol flow through the column was 800 ml. per minute and the inlet temperature to the column was 208° to 210° F. The spheres recovered from the bottom of the column were immersed in 28 percent ammonium solution to complete gelation of any soluble uranium, washed briefly to remove the ammonia, rinsed in acetone several times to remove the water and then air dried. The size of the spheres recovered was observed. The data collected in this series of runs is set out in table I below:

Table I

Size Distribution with Changing Frequencies

| Run No. | 1 | 2 | 3 |
|---|---|---|---|
| Vibrator frequency, c.p.s. | off | 111 | 188 |
| Sol flow rate, ml./min. | 5.7 | 10.9 | 5.6 |
| Hexanol leaving column, °F. | 165 | 171 | 166 |
| Hexanol pH | 8.2 | 7.4 | 7.8 |
| Size Range in microns | Percentage in size range | | |
| 110–176 | 0 | 6 | 0 |
| 176–253 | 10 | 0 | 1 |
| 253–308 | 6 | 0 | 2 |
| 308–374 | 16 | 28 | 82 |
| 374–440 | 55 | 65 | 10 |
| 440–550 | 13 | 1 | 5 |

This data shows that the apparatus can be used to control the size of the spheres and to control the variation in the number of spheres falling outside a certain size range. The operation of the vibrator was controlled so that 94 percent of the spheres fell in a close size range.

Example II

Two runs were completed to investigate the size distribution when no vibrator was used. The conditions were very close to run 2 of example I. The hexanol flow in the column was 800 ml./min. The hexanol was heated to a temperature of 210° to 212° F. entering the column. The sol was fed into the column through a 22 gauge hypodermic needle. The data collected in these two runs is set out in table II below:

TABLE II

Size Distribution of Microspheres

| Run No. | 1 | 2 |
|---|---|---|
| Sol flow, ml./min. | 8.5 | 9.4 |
| Hexanol leaving column, °F. | 166 | 168 |
| Hexanol pH | 8.7 | 8.7 |
| Size Range in Microns | Percentage in size range | |
| 110–176 | 6 | 5 |
| 176–253 | 6 | 7 |
| 253–308 | 11 | 5 |
| 308–374 | 18 | 17 |
| 374–440 | 26 | 32 |
| 440–550 | 29 | 25 |
| 550–660 | 3 | 9 |

The data emphasize the advantage of using the disclosed apparatus in the process for making microspheres. The size distribution varied over a wide range. Where the vibrator was not used the spheres were not concentrated in the close size range as in the last two runs of example I.

EXAMPLE III

The effect of the frequency of the vibrator on the initial size of the droplets was measured in a run in which a dilute potassium permanganate solution was used as a feed to improve the visibility in the column. In this run, a 23 gauge hypodermic needle was used as the orifice. The motion of the droplets was stopped by means of a stroboscope, and the diameter was measured with a cathatometer. The apparatus used was that in FIG. 1. The data collected in these runs is set out in the table below:

TABLE III

| Run No. | 1 | 2 |
|---|---|---|
| Vibrator frequency in c.p.s. | 34 | 68 |
| Droplet diameter in cm. | 0.217 | 0.178 |

It is apparent from these data that the size of the droplet can be substantially reduced by increasing the frequency of the vibrator.

Additional runs are made in which the frequency of the vibrator was increased by a factor of 10. A $UO_2$ sol containing 100 grams per liter of $UO_2$ was fed into the column at the rate of 5 ml. per minute during each of the tests. A 22 gauge hypodermic needle was used as the orifice. The diameter of the initial droplets was measured by cathatometer after a stroboscope had been used to stop the motion of the droplets. The vibrations were produced by the apparatus shown in FIG. 2 in which a loud speaker or driver is attached directly to the orifice. The data collected in this series of runs is set out in the table below:

TABLE IV

| Run No. | Frequency in c.p.s. | Volume | Droplet Diameter in cm. |
|---|---|---|---|
| 1 | 65 | ½ max. | 0.155 |
| 2 | 650 | ½ max. | 0.138 |
| 3 | 84 | ⅔ max. | 0.160 |
| 4 | 840 | ⅔ max. | 0.120 |

It is apparent from these data that the initial droplet size (which controls the size of the final microsphere product) can be regulated by changing the frequency of the vibrator. As would be expected, increasing the frequency tenfold resulted in a substantial decrease in the diameter of the droplets.

Obviously many modifications and variations of the invention may be made without departing from the essence and scope thereof and only such limitations should be included as are limited in the appended claims.

What is claimed is:

1. A process for forming spherical particles from an aqueous feed of dispersed metal oxides selected from the group consisting of uranium dioxide, uranium trioxide, plutonium dioxide, plutonium trioxide, zirconium dioxide, yttrium oxide, lanthanide oxides, beryllium oxide and mixtures thereof with colloidal carbon and solutions of metal ions selected from the group consisting of $U^{+4}$, $(UO_2)^{+2}$, $Th^{+2}$, $Pu^{+4}$, $(PuO_2)^{+2}$, $(ZrO_2)^{+2}$, $Be^{+2}$, $Y^{+3}$, lanthanides and mixtures thereof, with colloidal carbon, the improvement comprising controlling the size of the microsphere product within a preselected size range by feeding the aqueous feed into a column containing at least one solvent while subjecting the feed to sonic vibrations of predetermined frequency and amplitude and recovering the microsphere product.

2. The process of claim 1 wherein the solvent is chosen from the group consisting of a dehydrating solvent, a water-saturated solvent containing ammonia dissolved therein, and a two-layer system, one layer of which is a water-saturated solvent, the second and lower layer of which is an aqueous ammonia solution.

3. The process according to claim 1 wherein the feed is prepared, passed under pressure to a reservoir, subjected to sonic vibrations in said reservoir and then passed into the column through a tube having an aperture of about 0.008–0.047 inches.

4. The process according to claim 1 wherein the feed is subjected to sonic vibrations through a vibrator positioned in the feed line and fed into the column through a tube having an aperture of about 0.008 inches –0.047 inches.

5. The process according to claim 1 wherein the feed is subjected to sonic vibrations induced into the feed by positioning a rod which is attached to the loudspeaker or driver on the tubes that carry the feed to the column.

6. The process according to claim 1 wherein the feed is subjected to vibrations having a frequency of about 20–900 c.p.s. to produce a product composed of particles, 90 percent of said particles differing from the mean by less than 20 percent.

* * * * *